Figure 1:
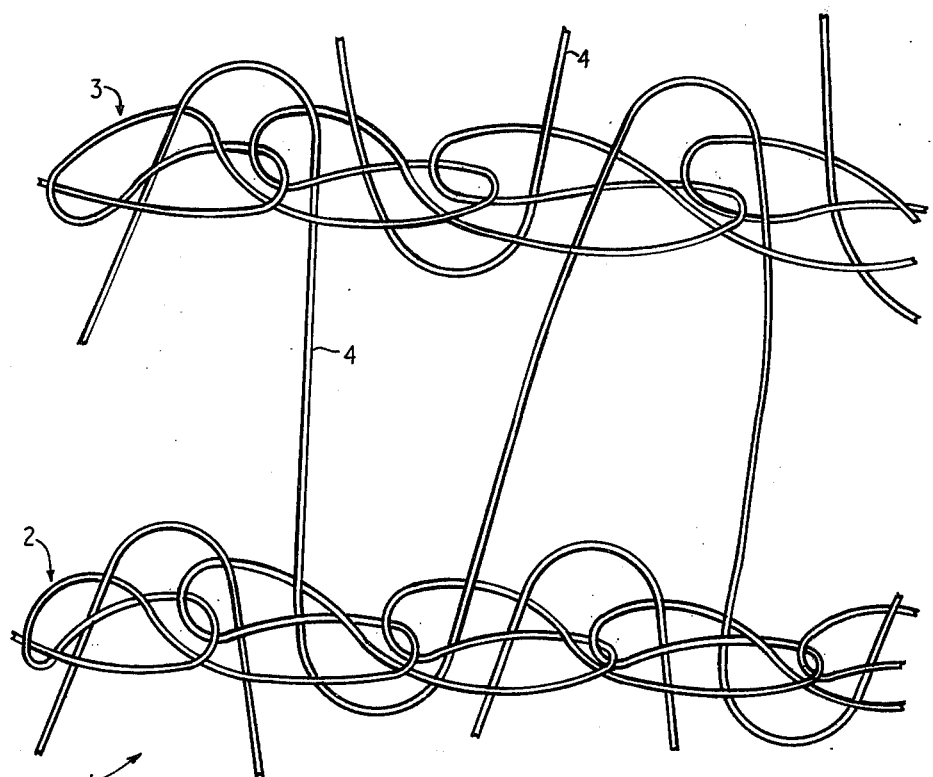

United States Patent [19]

Aitchison et al.

[11] 4,075,377
[45] Feb. 21, 1978

[54] COVERING FLOORS WITH STRIPPABLE CARPET

[75] Inventors: Lindsay Matthew Aitchison; Kenneth Arnold Sparks; Earl Eugene Schuster, all of East Sydney, Australia

[73] Assignee: Monobond Australia Pty. Limited, East Sydney, Australia

[21] Appl. No.: 668,500

[22] Filed: Mar. 19, 1976

Related U.S. Application Data

[63] Continuation of Ser. No. 488,799, July 15, 1974, abandoned.

[30] Foreign Application Priority Data

July 23, 1973 New Zealand .................. 171456

[51] Int. Cl.² ........................................... B32B 33/00
[52] U.S. Cl. ................................. 428/95; 428/96; 428/97; 428/253
[58] Field of Search .............. 428/85, 95, 97, 96, 428/253

[56] References Cited

U.S. PATENT DOCUMENTS

| 3,704,197 | 11/1972 | Bahlo | 428/95 |
| 3,847,647 | 11/1974 | Bahlo | 428/95 |
| 3,969,564 | 7/1976 | Carder | 428/62 |

*Primary Examiner*—Marion E. McCamish
*Attorney, Agent, or Firm*—Irving M. Weiner; Pamela S. Austin

[57] ABSTRACT

In a floor covering a layer of resilient material is bonded to the bottom of an upper layer and reinforcement is provided associated with or adjacent the bottom surface of the resilient material, whereby the floor covering can be secured to a floor by an adhesive, but can subsequently be peeled off the floor. An important embodiment is a carpet having a foam rubber-like underlay bonded to the carpet back and a mesh of plastic material positioned on the carpet back. Generally, the covering may be laid on a floor by laying the reinforcement mesh or the like on a floor, spraying or otherwise distributing adhesive material and the laying of the covering to secure it by the adhesive.

8 Claims, 2 Drawing Figures

U.S. Patent

Feb. 21, 1978

4,075,377

COVERING FLOORS WITH STRIPPABLE CARPET

This is a continuation of application Ser. No. 488,799, filed July 15, 1974, now abandoned.

The present invention relates to covering floors and in one application is directed to covering a floor such as the concrete floor of a building with carpet.

New Zealand patent application No. 159167 describes a method of laying a carpet having a foam backing which is bonded to the carpet, the method comprising using an adhesive to secure the carpet to the floor of the building. Whilst this method can provide a satisfactory carpet which is firmly secured to the floor and will not move, severe problems can be experienced in trying to take up this carpet, for example for the purpose of re-laying or even for the temporary purpose of providing access to electrical ducts or other services.

If during an attempt to take up a carpet laid by this method results in the foam backing of the carpet breaking away from the main part of the carpet, either partially or wholly, it is necessary to conduct a very expensive operation of cleaning the floor by slow and tedious manual means to remove the remnants of the foam which adhere to the floor. Only then can a new carpet be laid. Furthermore, the carpet which has been taken up might well be basically suitable for further use but with a damaged torn or lost foam backing, the carpet may well not be resaleable. By contrast, the present invention, at least in a prefered embodiment, may at least to some extent tend to overcome the problems inherent in the prior arrangements for securing floor covering to a floor of a building.

According to one aspect of the invention, there is provided a floor covering comprising a first layer having a surface for carrying traffic, and a second layer secured to the first layer and providing a resilient foam backing which is to be laid on a floor and secured thereto by adhesive. Also provided is a knitted open mesh of material having a multiplicity of openings therein accounting for a large proportion of the area of the mesh and located on the side of the second layer remote from the first layer for contacting the floor on which the floor covering is to be laid. Thus, the application of an adhesive to the floor permits portions of said resilient foam backing to adhere to the floor through the multiplicity of openings in the open mesh and by pulling on the open mesh the first and second layers which are secured together, the floor covering may be peeled subsequently off the floor without leaving gross quantities of the foam backing adhering to the floor.

In another embodiment of the invention, a floor covering is provided as described above, wherein the first and second layers are in a roll and the open mesh is in a separate roll, the rolls being adapted to be unrolled over the floor in a laying operation.

The invention also extends to a kit of parts for covering a floor comprising carpet having a foam underlay bonded to the back of the carpet, mesh material of plastics material for positioning under the underlay and adhesive material, whereby the adhesive can be used to secure the carpet to the floor with the mesh between the floor and the lower free surface of the underlay, whereby subsequently the carpet can be peeled off the floor substantially without separating portions of the underlay from the backing of the carpet.

In another aspect, the invention provides a method of laying floor covering having a bottom surface for being secured to a floor, the method comprising positioning reinforcing means between said base surface and the floor, the floor covering being secured in position by the use of adhesive material tending to bond together said base surface, the mesh, and the floor where any two of these elements are in contact, the arrangement being such that the carpet can subsequently be peeled off the floor.

The invention is especially applicable to floor coverings in the form of carpets comprising a backing on which woollen or similar tufts are woven or secured and a foam backing which may be of rubber or the like bonded to the lower side of the carpet.

The mesh preferably is arranged to be located between the floor and the lower surface of the floor covering. By using a mesh, portions of the floor covering at the holes in the mesh can be secured by adhesive material in direct contact with the floor. However, the invention may permit the carpet to be peeled off the floor by suitable selection of adhesives and by chosing the mesh holes to be relatively small, for example having an area no larger than 50 square millimeters substantially clean peeling off of the carpet from a floor may be provided.

It has been found that a knitted mesh of polypropylene conveniently formed from flat filaments cut from sheet film can provide a suitable mesh.

Figure 2:
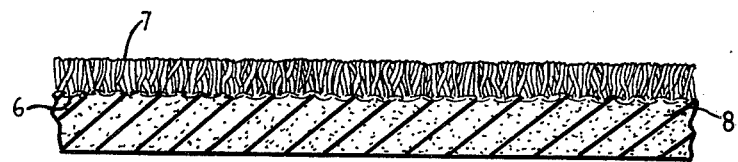

One embodiment of the invention will now be described, by way of example, with reference to the accompanying drawings, of which:

FIG. 1 is a schematic elevation of one form of mesh, the drawing showing the respective elements in an exploded form; and FIG. 2 is a cross-sectional elevation illustrating the securing of a carpet to a floor.

The mesh 1 shown in FIG. 1 is formed from flat filaments of polypropylene film which have been prepared by slitting sheets. The mesh is then knitted by forming a first filament into a looped first runner 2 and a looped second runner 3, each runner being formed from a single filament. A bridging filament 4 is then woven back and forth between the runners 2 and 3, the filament 4 passing through a first loop in an outward direction then back through the next loop in an inward direction, across to the other runner to pass through this runner in a similar manner before coming back to the first runner in the manner shown in the drawing. This mesh is knitted or woven on any suitable machine and the description above is merely intended to be a description of the final product rather than the method of knitting.

A suitable knitted mesh for use in connection with this invention is available in Australia and supplied by the firm B. & S. Industries Pty. Limited of 33 Mountain Street, Ultimo, New South Wales 2007, under the product number R001 and sold under the trade name "Polyknit". This mesh is believed to be of polypropylene and is of the type generally shown in FIG. 1. In the mesh which is preferred, the distance between adjacent runners is approximately 1 centimeter whereas adjacent bridging runs of the bridging element 4 are spaced by about 5 millimeters in the longitudinal direction of a runner.

Referring now to FIG. 2, a building has a concrete floor 5 on which it is desired to secure a carpet, the carpet comprising a conventional woven backing 6 into which is woven, or secured woollen or similar tufts 7 thereby forming an upstanding pile for the carpet, the carpet having an integral underlay provided by a foam rubber layer 8 bonded to the bottom of the backing 6 and the tufts 7.

The method of laying the carpet will now be described with reference to a typical application wherein a carpet is to be laid over the floor of an office building and the carpet is supplied in rolls 6 feet wide.

The carpet having a foam back is laid out and cut into the desired lengths and shapes so as to fit the floor to be covered, the carpet being arranged to have butt edges between strips of carpet from the roll. With most carpets it is necessary to trim selvedges and in order to get an accurate butt joint the edge of a first strip of carpet is trimmed with a straight edge, the second strip is laid with the edge of the first strip in overlapping relation, and the second strip is then trimmed using the edge of the first strip as a guide.

Each strip of carpet is folded back from a joint by a distance of about two feet leaving a clear strip of about four feet of the floor exposed. It is important to ensure the bulk of the carpet does not move during this operation. The knitted polypropylene mesh having a width of about 40 inches is then rolled out over this exposed floor and cut to the required length. The mesh is preferably that sold by B. & F. Industries Pty. Limited of 33 Mountain Street, Ultimo, New South Wales, Australia, under the code R001 and under the trade name "Polyknit".

Each strip of carpet is rolled back approximately two inches over the selvedges of the mesh which has been rolled out in order to secure and hold the mesh in position. Adhesive is then sprayed over the mesh and a layer is thereby provided also on the floor by passing through the holes in the mesh. Preferably the adhesive is sprayed, for example by using airless spray equipment such as a unit available in Australia under the trade name "Graco EM 350" having an 821 or 819 tip. Alternatively a "Binks Bullows Portascat" unit with an 819 tip may be used. The adhesive preferably used is that available from Bostik Australia Pty. Limited and referred to as "Bostik 823 Sprayable Carpet Adhesive." This adhesive is suitable for use with latex foam backed carpets but if a P.V.C. foam backed carpet is to be used then a different adhesive should be selected. Bostik 823 is a synthetic rubber, resin solvent adhesive which has a very long open time thereby allowing larger areas to be sprayed before laying the carpet. The open time for the Bostik 823 is 10 minutes to 3 hours.

The solvent of the adhesive rapidly evaporates permitting the carpet to be laid, this being effected by rolling a first width of the carpet evenly over the mesh and into contact with the adhesive on the mesh and on the floor. An even bead of seam adhesive is then applied along the length of the seam by applying this bead along the edge of the carpet which has been laid. The bead should cover completely the bonding line between the carpet backing and the latex foam in order to obviate possible delamination at this point. The second width of carpet is then rolled into position over the mesh and into contact with the adhesive and a butt joint is effected between the edge of this width of carpet and the edge of the first length of carpet having the bead of adhesive. Should any surplus seam adhesive get into the carpet pile, it can be removed using a suitable solvent.

The laying operation can be completed by rolling the carpet to ensure correct laying.

Should the carpet have to be removed or even a section of the carpet removed for replacement then it is simply a matter of lifting up an edge of the carpet, gripping the carpet and the mesh together and peeling the floor clean. Without further operations it should be possible to relay a fresh carpet, and the carpet which has been taken up may well be in a good enough condition to be resold for further use.

This method of operation can permit immediate use of the carpeted floor and it is not necessary for a 48-hour curing time to be permitted for the adhesive to settle. Furthermore, when it comes to taking up the carpet, no significant difference should be experienced with regard to areas which have received heavy loads or foot traffic and areas which have received little load. Uniform peelability should result.

In a new office building it is usual for a floor to be carpeted and then partitions to be installed where desired. However, the cost of dismantling the partitions temporarily for the purpose of removing the carpet and in order to relay a new carpet at a future date is very great. By contrast, use of the above prefered embodiment of the invention permits a cutter to be used to trim the old carpet precisely along the edge of the partition wall, the old carpet to be peeled off and a new carpet to be laid and secured in position with adhesive to cover precisely the stripped area. In this way the partition walls neet not be moved at all.

We claim:
1. A floor covering comprising:
   a first layer having a surface for carrying traffic;
   a second layer secured to the first layer and providing a resilient foam backing which is to be laid on a floor and secured thereto by adhesive; and
   a knitted open mesh of material having a multiplicity of openings therein accounting for a large proportion of the area of the mesh and located on the side of said second layer remote from said first layer for contacting the floor on which the floor covering is to be laid, whereby the application of an adhesive to the floor permits portions of said resilient foam backing to adhere to the floor through said multiplicity of openings in the open mesh and by pulling on the open mesh said first and second layers which are secured together, the floor covering may be peeled subsequently off the floor without leaving gross quantities of said foam backing adhering to the floor.

2. A floor covering as claimed in claim 1, wherein said first and second layers are in a roll and said open mesh is in a separate roll, said rolls being adapted to be unrolled over the floor in a laying operation.

3. A floor covering as claimed in claim 1, wherein said open mesh is a knitted polypropylene mesh of flat filament.

4. A floor covering as claimed in claim 3, wherein the area of each of said multiplicity of openings does not exceed an area of about 50 square millimeters and the proportion of the mesh taken up by said multiplicity of openings is a very large majority of the total area.

5. A floor covering comprising:
   a tufted carpet having tufts secured in a primary backing and a resilient foam underlay bonded to said primary backing; and
   a separate open mesh of knitted polypropylene for location between said foam underlay and a floor whereby adhesive applied to the floor can secure the underlay through openings in the mesh to the floor but the carpet can be peeled off by a peeling action involving the application of pressure to the open mesh.

6. A method of laying a floor covering comprising the steps of:

laying a knitted open mesh of material having a multiplicity of openings therein accounting for a large proportion of the area of the mesh on the floor to be covered;

applying adhesive to the floor and laying a first layer having a surface for carrying traffic secured to a second layer providing a resilient foam backing which is to be laid on a floor over the open mesh with the side of the second layer remote from the first layer adhering to the floor in its portion aligned with openings in the open mesh.

7. A method as claimed in claim 6, wherein said adhesive is a transfer contact adhesive for securely retaining the floor covering in position during use and permitting the floor covering to be peeled off the floor at a subsequent point in time.

8. A method as claimed in claim 7, wherein prior to applying said adhesive, the first and second layers which are secured together are laid in position and cut to size as necessary and then folded back, the method then comprising laying the open mesh in position and spraying said adhesive over the floor.

* * * * *